July 25, 1961   L. A. WORSHAM   2,993,704
VEHICLE ATTACHMENT FOR STABILIZING STEERABLE WHEELS
Filed June 12, 1959   2 Sheets-Sheet 1

INVENTOR.
LESTER A. WORSHAM,
BY
McMorrow, Berman & Davidson
ATTORNEYS.

INVENTOR.
LESTER A. WORSHAM,
BY
McMorrow, Berman & Davidson
ATTORNEYS.

United States Patent Office 2,993,704
Patented July 25, 1961

2,993,704
VEHICLE ATTACHMENT FOR STABILIZING STEERABLE WHEELS
Lester A. Worsham, P.O. Box 559, Cedartown, Ga., assignor of one-half to William C. Blair, Cedartown, Ga.
Filed June 12, 1959, Ser. No. 819,988
5 Claims. (Cl. 280—96.2)

This invention relates to improved safety stabilizers for the steerable wheels of automobiles.

The primary object of the invention is to provide efficient and reliable devices of the kind indicated, which, in the form of attachments, are easily and quickly attachable, and which, in the form of permanent adjuncts, can be readily incorporated in wheel suspensions and secured to the steerable wheels thereof, the said devices serving to return the steerable wheels to alignment with the fixed wheels of vehicles should the steering gear fail, so as to enable safe stopping thereof, and serving to hold the steerable wheels in alignment, where they would otherwise be subject to lateral deviations and "shimmy" due to worn wheel bearings and/or worn steering gear parts, accompanied by abnormal tire-tread wear, and reduce strain and wear on unworn steering gear parts.

Another object of the invention is to provide devices of the character indicated above which are of simple construction, being composed of a small number of simple and easily assembled components, and which can be produced in rugged and serviceable forms at relatively low cost.

Other important objects and advantageous features of the invention will be apparent from the following description and the accompanying drawings, wherein, for purposes of illustration only, a specific form of the invention is set forth in detail.

Figure 1:
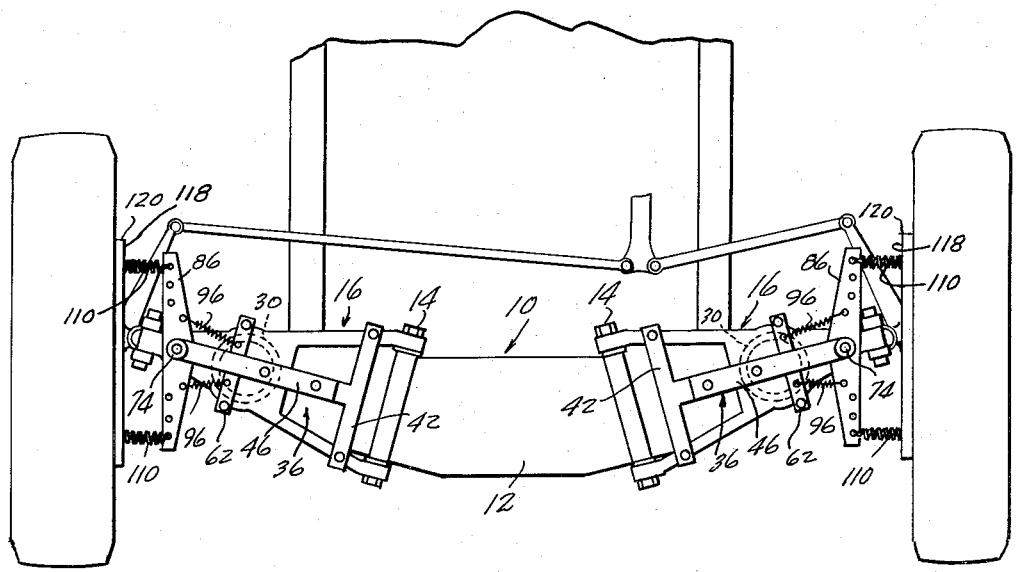
FIGURE 1 is a fragmentary top plan view of a front or steerable wheel, knee-action automobile suspension, showing devices of the invention installed thereon.

Referring in detail to the drawings, wherein like numerals designate like parts throughout the several views, the numeral 10 generally designates an automobile front wheel suspension, comprising a cross member 12, having pivoted on the underside thereof at 14, at each end thereof, a lower knee-action A-frame 16, and having pivoted on the upper side thereof, at each end, at 17, an upper A-frame 18, the A-frames being severally pivoted at their outward ends, at 20 and 22, the upper and lower ends, respectively, of steering knuckles 24, which carry, outwardly thereof on spindles 26, steerable wheels 28. Compressed between and secured to related upper and lower A-frames are vertical suspension coils 30 whose ends engage upper and lower spring seats 32 and 34, respectively. It will be understood that the invention is also applicable to suspensions other than that described above only for illustration.

In accordance with the present invention, there is installed on each lower A-frame 16, either by attachment or by built-in incorporation therein, a device of the invention for separately controlling each wheel 28, whereby the wheels are coordinated in their responses to the devices by the fact of the connection of the steering gear (not shown) which is connected in conventional manner to and between the wheels.

Figure 3:
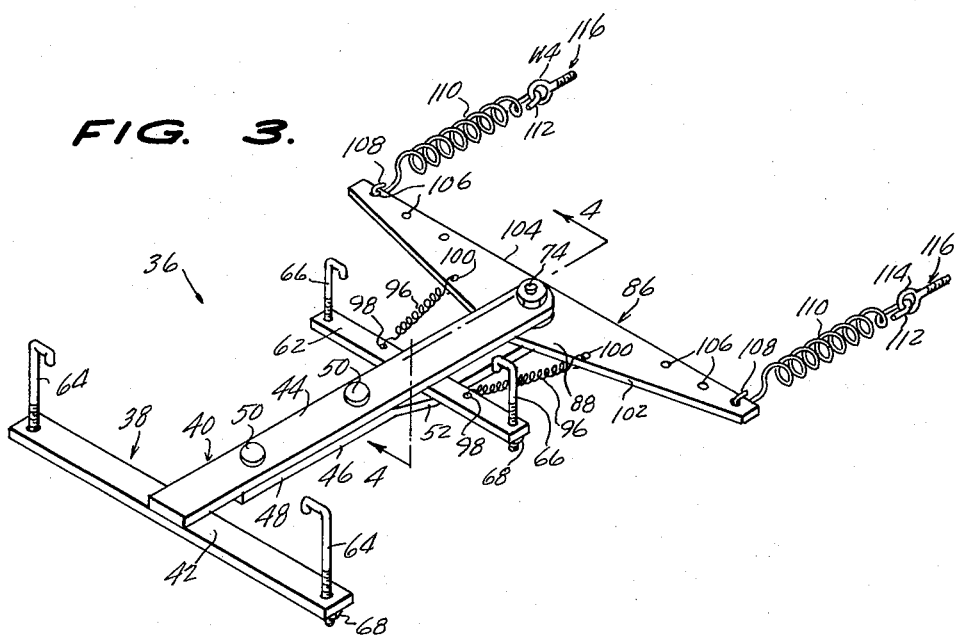
FIGURE 3 is an enlarged perspective view of one of said devices.

Each device of the invention, generally designated 36, comprises, as shown in FIGURE 3, a rigid T-shaped frame 38, having an elongated dual bar member 40 having a single bar cross head 42 fixed on its inward end. The dual bar member 40 comprises a flat, straight full-length upper bar 44, and a shorter lower bar 46 having a straight, flat inward end portion 48 underlying and fixed to the underside of the upper bar, at a point spaced outwardly from the crosshead 42, as by longitudinally spaced rivets 50, and a downwardly offset outer end portion 52. The outer end portion 52 comprises an outwardly and downwardly angled or declining part 54 and a straight horizontal part 56 which is parallel spaced beneath the upper bar 42, and has an outward end 58 which terminates in vertical alignment with the outward end 60 of the upper bar. Fixed in suitable manner as by welding, to the underside of the upper bar 44 at the inward end of the lower bar part 56 is a cross bar 62, which, in the illustrated embodiment of the invention, is shorter than the crosshead 42. Extending through the crosshead 42 and the cross bar 62, at their free ends, are upstanding inverted J-bolts 64 and 66, respectively, which have clamping nuts 68 on their lower ends beneath the crosshead and the cross bar.

Figure 4:
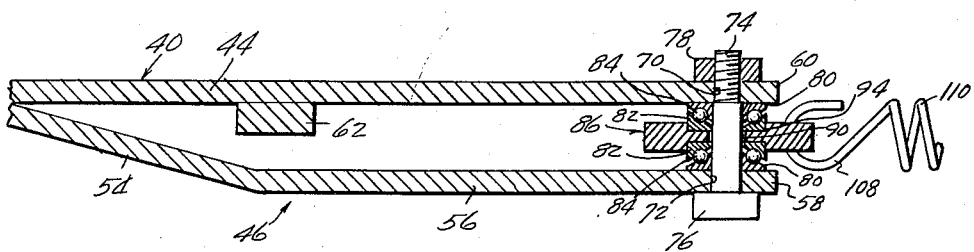
FIGURE 4 is a further enlarged fragmentary longitudinal section taken on the line 4—4 of FIGURE 3.

Vertically aligned bores 70, 72 extend through the upper and lower bars 44, 46, at their outward ends 58, 60, respectively, to receive a relatively stationary bolt 74 having a fixed head 76 and a nut 78 on its opposite ends to lock the bolt relative to the upper and lower bars. The bolt 74 has circumposed thereon a suitable anti-friction thrust bearing assembly which is here shown as being composed of opposed upper and lower bearings, each comprising a stationary race 80 and a rotary race 82 confining balls 84 therebetween. A cross arm 86, which can be longer or shorter than the cross head 42, has a preferably widened central portion 88 which has a centered vertical bore 90 therethrough located at the midpoint between the free ends 92 of the cross arm 86. The cross arm bore 90 spacedly and concentrically passes the bolt 74, and cylindrical recesses 94, concentric with the bore 90, and located in the upper and lower sides of the cross arm 86, seat the rotary bearing races 82, as shown in FIGURE 4, whereby the cross arm 86 is mounted on the bar member 40 and is confined to rock on a substantially perpendicular axis thereon.

A pair of relatively weak springs, such as contractile coil springs 96, of similar length, are stretched between and are connected at their inward ends, as indicated at 98, to the cross bar 62, at points midway between the bar member 40 and the J-bolts, and at their outward ends, as indicated at 100, to the cross arm 86, at points more greatly spaced from the bar member 40 than the connections 98 and near the inward edge 102 of the cross arm 86, so that the springs 96 diverge outwardly toward the cross arm. Along the outward edge 104 of the cross arm 86 are similar sets of longitudinally spaced holes 106, near the free ends thereof, in which are selectively engageable the hooks 108 on the inward ends of heavier springs 110, which have hooks 112 on their outward ends engaged in the eyes 114 of eye-bolts 116.

Figure 2:
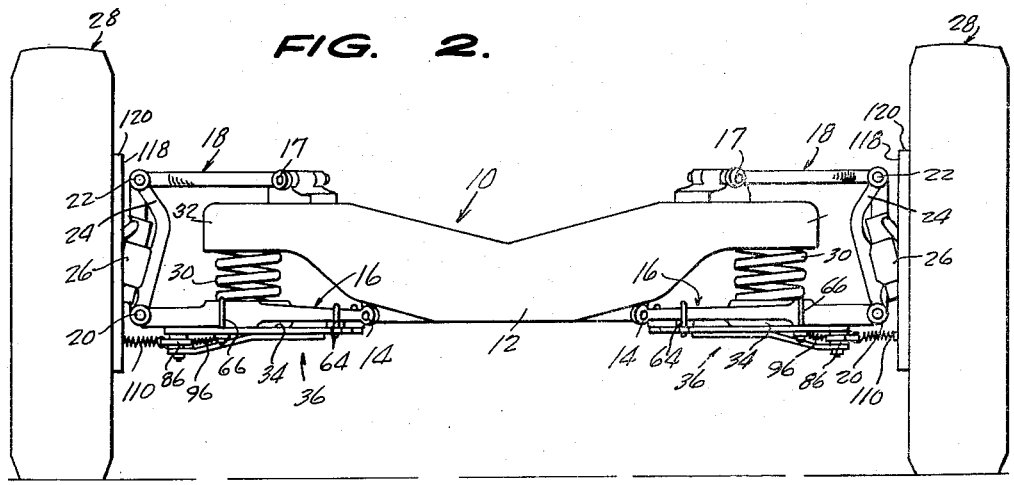
FIGURE 2 is a front elevation of FIGURE 1.

As shown in FIGURES 1 and 2, a device 36 is attached to the underside of each lower A-frame 16 of the wheel suspension 10, with the bar members 40 thereof intersecting the vertical axes of the suspension coil springs 30 and the vertical pivotal axes of the steering knuckles 24, and with the vertical pivotal axes of the cross arms 86, on the bolts 74, located intermediate the springs 30 and the steering knuckles 24.

The bar members 40 bear against the undersides of the lower spring seats 34, and the crossheads 42 against the undersides of the lower A-frame arms, with the J-bolts 64 hooked around these arms and tightened, at points near the inward ends of the lower A-frames. The J-bolts 66 on the cross bar 62 are hooked around the lower A-frame arms at points in the regions of the outward sides of the springs 30 and tightened, so as to hold the devices 36 in place.

The eye-bolts 116 on the outward ends of the heavy springs 110 are threaded into the inward sides 118 of the backing plates 120 of the wheels 28, at diametrically opposed horizontal points, so that when the wheels 28 are turned out of straight-ahead positions, in alignment with the associated rear wheels (not shown) the cross arms 86 will turn or rock with the wheels, against the resistance of the smaller springs 96, and with only limited, if any, change in normal parallel relations of the cross arms 86 to the wheel backing plates 120. The smaller springs 96 are strong enough, however, to rock the cross arms 86 back to their normal positions, and thereby straighten up the wheels 28, should the associated steering gear (not shown) break or otherwise fail, so that the automobile can be slowed to a stop, in straight forward travel, and dangerous swerving of the automobile, and perhaps ditching thereof, are avoided.

The heavier springs 110 act directly between the wheel backing plates 120 and the cross arms 86, and indirectly through the smaller springs 86, to keep the wheels 28 in alignment, despite the existence of worn steering knuckles or wheel bearings, and looseness in the steering gear; and at the same time to reduce or eliminate steering wheel shock and vibration of the suspension 10, which would otherwise be accompanied by such conditions.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, an automobile knee-action wheel suspension including a cross member having a lower A-frame having an inward end horizontally pivoted on the cross member and an outward end, a steering knuckle horizontally pivoted on the outward end of the A-frame and having a horizontal axis rotary wheel pivoted on a vertical axis on said knuckle, a rigid frame fixed to the underside of the A-frame, said rigid frame having a bar member extending centrally and longitudinally of the A-frame and having an outward end, said wheel having a backing plate spaced outwardly from the outward end of the bar member, a cross arm pivoted intermediate its ends on said outward end to rock on a vertical axis, strong springs connected at one end to the ends of the cross arm and at their other ends to diametrically opposed points of said backing plate, said points being in a horizontal plane, and weaker springs connected at one end to the cross arm at points spaced at opposite sides of the pivotal axis of the cross arm and at their other ends to said rigid frame.

2. In combination, an automobile knee-action wheel suspension including a cross member having a lower A-frame having an inward end horizontally pivoted on the cross member and an outward end, a steering knuckle horizontally pivoted on the outward end of the A-frame and having a horizontal axis rotary wheel pivoted on a vertical axis on said knuckle, a rigid frame fixed to the underside of the A-frame, said rigid frame having a bar member extending centrally and longitudinally of the A-frame, and having an outward end, said wheel having a backing plate spaced outwardly from the outward end of the bar member, a cross arm pivoted intermediate its ends on said outward end to rock on a vertical axis, strong springs connected at one end to the ends of the cross arm and at their other ends to diametrically opposed points of said backing plate, said points being in a horizontal plane, and weaker springs connected at one end to the cross arm at points spaced at opposite sides of the pivotal axis of the cross arm and at their other ends to said rigid frame, said rigid frame being T-shaped, said bar member having an inward end having a crosshead fixed thereon, a cross bar fixed on said bar member at a point spaced from said crosshead and the outward end of the bar member, said crosshead and said cross bar having free ends having thereon upstanding J-bolts hooked around related sides of said lower A-frame.

3. In combination, an automobile knee-action wheel suspension including a cross member having a lower A-frame having an inward end horizontally pivoted on the cross member and an outward end, a steering knuckle horizontally pivoted on the outward end of the A-frame and having a horizontal axis rotary wheel pivoted on a vertical axis on said knuckle, a rigid frame fixed to the underside of the A-frame, said rigid frame having a bar member extending centrally and longitudinally of the A-frame and having an outward end, said wheel having a backing plate spaced outwardly from the outward end of the bar member, a cross arm pivoted intermediate its ends on said outward end to rock on a vertical axis, strong springs connected at one end to the ends of the cross arm and at their other ends to diametrically opposed points of said backing plate, said points being in a horizontal plane, and weaker springs connected at one end to the cross arm at points spaced at opposite sides of the pivotal axis of the cross arm and at their other ends to said rigid frame, said bar member comprising a substantially flat straight upper bar and a lower bar, said lower bar having an inward part fixed to the underside of the upper bar at a point intermediate the ends of the upper bar and an outward downwardly offset part which is spaced from the underside of said upper bar, said upper and lower bars having vertically aligned outward ends, a vertical bolt extending through said upper and lower bars at their outward ends, said cross arm having an intermediate portion journaled on said bolt between the upper and lower arms.

4. In combination, an automobile knee-action wheel suspension including a cross member having a lower A-frame having an inward end horizontally pivoted on the cross member and an outward end, a steering knuckle horizontally pivoted on the outward end of the A-frame and having a horizontal axis rotary wheel pivoted on a vertical axis on said knuckle, a rigid frame fixed to the underside of the A-frame, said rigid frame having a bar member extending centrally and longitudinally of the A-frame and having an outward end, said wheel having a backing plate spaced outwardly from the outward end of the bar member, a cross arm pivoted intermediate its ends on said outward end to rock on a vertical axis, strong springs connected at one end to the ends of the cross arm and at their other ends to diametrically opposed points of said backing plate, said points being in a horizontal plane, and weaker springs connected at one end to the cross arm at points spaced at opposite sides of the pivotal axis of the cross arm and at their other ends to said rigid frame, and means for connecting the strong springs to the cross arm at different selected locations along the cross arm.

5. In combination, an automobile knee-action wheel suspension including a cross member having a lower A-frame having an inward end horizontally pivoted on the cross member and an outward end, a steering knuckle horizontally pivoted on the outward end of the A-frame and having a horizontal axis rotary wheel pivoted on a vertical axis on said knuckle, a rigid frame fixed to the underside of the A-frame, said rigid frame having a bar member extending centrally and longitudinally of the A-frame and having an outward end, said wheel having a backing plate spaced outwardly from the outward end of the bar member, a cross arm pivoted intermediate its ends on said outward end to rock on a vertical axis, strong springs connected at one end to the ends of the cross arm and at their other ends to diametrically opposed points of said backing plate, said points being in a horizontal plane, and weaker springs connected at one end to the cross arm at points spaced at opposite sides of the pivotal axis of the cross arm and at their other ends to said rigid frame, said bar member comprising a substantially flat straight upper bar and a lower bar, said lower bar having an inward part fixed to the underside of the upper bar at a point intermediate the ends of the upper bar and an outward downwardly offset part which is spaced from the underside of said upper bar, said upper and lower bars having vertically aligned outward ends, a vertical bolt extending through said upper and lower bars at their outward ends, said cross arm having an intermediate portion journaled on said bolt between the upper and lower arms, and anti-friction thrust bearing means on said vertical bolt carrying said cross arm and spacing the cross arm from the upper and lower bars.

References Cited in the file of this patent

UNITED STATES PATENTS

| | | |
|---|---|---|
| 980,185 | Benjamin | Jan. 3, 1911 |
| 1,064,111 | Tower | June 10, 1913 |
| 1,447,757 | Cannon | Mar. 6, 1923 |
| 1,616,429 | McCrillis | Feb. 1, 1927 |
| 2,627,404 | Beason | Feb. 3, 1953 |
| 2,882,065 | Von Rucker | Apr. 14, 1959 |